US009077915B2

(12) United States Patent
Kolstad et al.

(10) Patent No.: US 9,077,915 B2
(45) Date of Patent: Jul. 7, 2015

(54) INTERWEAVING OF IR AND VISIBLE IMAGES

(75) Inventors: Kristian Kolstad, Sarpsborg (NO); Kjell Einar Olsen, Krakeroy (NO)

(73) Assignee: Projectiondesign AS, Gamle, Fredrikstad (NO)

( * ) Notice: Subject to any disclaimer, the term of this patent is extended or adjusted under 35 U.S.C. 154(b) by 605 days.

(21) Appl. No.: 12/755,575

(22) Filed: Apr. 7, 2010

(65) Prior Publication Data
US 2011/0249014 A1 Oct. 13, 2011

(51) Int. Cl.
G09G 5/00 (2006.01)
H04N 5/33 (2006.01)
H04N 9/31 (2006.01)

(52) U.S. Cl.
CPC ............... *H04N 5/33* (2013.01); *H04N 5/332* (2013.01); *H04N 9/3111* (2013.01)

(58) Field of Classification Search
None
See application file for complete search history.

(56) References Cited

U.S. PATENT DOCUMENTS

| 4,530,010 | A * | 7/1985 | Billingsley | 348/187 |
| 4,751,571 | A | 6/1988 | Lillquist | |
| 8,016,425 | B2 | 9/2011 | Ito | |
| 2002/0051116 | A1 * | 5/2002 | Van Saarloos et al. | 351/204 |
| 2004/0207768 | A1 * | 10/2004 | Liu | 348/744 |
| 2005/0007334 | A1 * | 1/2005 | Park | 345/102 |
| 2005/0007562 | A1 * | 1/2005 | Seki et al. | 353/98 |
| 2005/0182321 | A1 * | 8/2005 | Frangioni | 600/431 |
| 2006/0001957 | A1 * | 1/2006 | Liang | 359/432 |
| 2006/0289772 | A1 * | 12/2006 | Johnson et al. | 250/370.08 |
| 2007/0153122 | A1 * | 7/2007 | Ayite et al. | 348/385.1 |
| 2007/0171376 | A1 * | 7/2007 | Wang et al. | 353/30 |
| 2007/0195408 | A1 * | 8/2007 | Divelbiss et al. | 359/462 |
| 2007/0200807 | A1 * | 8/2007 | Lee et al. | 345/88 |
| 2008/0151196 | A1 * | 6/2008 | Kinoshita | 353/69 |
| 2008/0165176 | A1 * | 7/2008 | Archer et al. | 345/213 |
| 2008/0174742 | A1 | 7/2008 | Ito | |

(Continued)

FOREIGN PATENT DOCUMENTS

JP 2007-329749 A 12/2007
WO WO 01/96824 A1 12/2001

OTHER PUBLICATIONS

The Invitation to Pay Additional Fees and Partial International Search Report for Application No. PCT/EP2011/001709, dated Jul. 21, 2011, 5 pages.

(Continued)

*Primary Examiner* — Aaron M Richer
*Assistant Examiner* — Anh-Tuan V Nguyen
(74) *Attorney, Agent, or Firm* — Kilpatrick Townsend & Stockton LLP

(57) ABSTRACT

Systems and methods for interweaving infrared and visible moving image data using a single optical system and imager device based on an infrared input signal and a visible input signal are disclosed. Infrared image frames can be substituted in for complete visible image input frames or for partial visible image input frames, i.e. substituting in an infrared image input frame for one or more of the color channels in one or more visible image input frames. Moving video or computer-generated moving graphics can include both infrared and visible image data to be displayed users viewing the resulting images with and without night vision imaging devices. In particular, the system and method can be used in projection systems for night-vision imaging device team training simulators to reduce the cost of the system while increasing the ease of use and performance of such systems.

12 Claims, 13 Drawing Sheets

(56) References Cited

U.S. PATENT DOCUMENTS

| | | | |
|---|---|---|---|
| 2008/0204667 A1* | 8/2008 | Kobori et al. | 353/38 |
| 2008/0316377 A1* | 12/2008 | Chen et al. | 349/9 |
| 2009/0015791 A1 | 1/2009 | Chang et al. | |
| 2009/0065679 A1* | 3/2009 | Tanimoto | 250/208.1 |
| 2009/0109349 A1* | 4/2009 | Kanai et al. | 348/744 |
| 2009/0174824 A1* | 7/2009 | Shirai et al. | 348/760 |
| 2009/0201418 A1 | 8/2009 | Endo et al. | |
| 2010/0033555 A1 | 2/2010 | Nagase et al. | |
| 2010/0110308 A1 | 5/2010 | Nicholson et al. | |
| 2010/0315595 A1* | 12/2010 | Marcus et al. | 353/8 |
| 2011/0109820 A1* | 5/2011 | Silverstein et al. | 349/8 |
| 2011/0228096 A1* | 9/2011 | Friel et al. | 348/164 |

OTHER PUBLICATIONS

PCT Search Report and Written Opinion for PCT/EP2011/001709 mailed Oct. 19, 2011, 17 pages.

Office Action mailed Dec. 26, 2014 in Chinese Patent Application No. 201180017339.7, 5 pages.

Japanese Office Action mailed on Mar. 6, 2015 for JP Patent Application No. 2013-503033, with Summary of Office Action in English, 7 pages.

* cited by examiner

INTERWEAVING OF IR AND VISIBLE IMAGES

BACKGROUND

Night vision goggles, cameras and other imager devices are useful in a variety of low and no light conditions. From search and rescue operations to nocturnal animal viewing and hunting, night vision imaging devices can reveal the world around us in situations in which the use of artificial illumination is impractical, impossible or otherwise undesirable. Many conventional night-vision imaging devices use portions of the near and/or far infrared spectrum, thus making them potentially useful for thermal.

The potential thermal imager capabilities of night vision imaging devices can be incredibly useful when deployed in search and rescue operations. In such situations, night vision imaging devices can be used to detect body heat of injured or unconscious people or animals that fall victim to natural disasters or other catastrophes. Although it is possible to search for victims of large-scale accidents and disasters using conventional artificial light such as spotlights, visible light searches will not reveal the thermal signature of a warm body as night vision imaging devices can. Furthermore, since conventional artificial light sources can often introduce extraneous infrared light and heat onto a scene and thus overload or blind night vision imaging devices, the use of artificial light source while using night vision imaging devices is often undesirable.

Night vision imaging devices are also desirable in situations in which use of artificial light is undesirable because it can either interfere with, spook or alert subjects, such as animals, when they are being observed or hunted in lowlight and no light situations. For example, scientists, such as biologists and zoologists, may wish to observe the nocturnal activities of various animals and insects without disturbing or influencing their behavior with artificial lights or revealing the location from which the observations are being made. Hunters may also find such capability desirable when hunting wild game.

However, for as useful as night vision imaging devices can be for low light and the no light conditions, their use can be restrictive when the user of such devices is required to navigate through space or operate vehicles such as a car or helicopter. Typical night vision imaging devices, such as night vision goggles 100 shown in FIG. 1, have limited fields of view, providing little to no peripheral vision to the user of the night vision goggles 100, which can make operating vehicles difficult or dangerous. The lack of peripheral vision often found with night vision imaging devices can often necessitate using night vision imaging devices in teams in which one person uses the night vision imaging device while the other uses unaided or natural vision to navigate or operate vehicles or other equipment.

FIGS. 2a and 2b illustrate the differences between the perceptions of a scene as viewed through a night vision imaging device and as viewed with the unaided eye. Although scenes 200a and 200b are of the same location in space and at the same time, the differences between the scenes include differences in perceived illumination color, level of observable detail and field of view. For instance, scene 200a depicts a scene as viewed through a night vision image imager device. In this case, the night vision imaging device might be a pair of night vision goggles, in which case the field of view might be limited to a portion of the scene within the boundaries of area 225a. As can be seen, the area 225a is significantly less than the entirety of the scene 200a. However, the typical trade-off for narrow field of view is an increase in the amount of detail visible to the user in low light conditions. For example trees 205a and dog 210a are much more visible in the scene 200a as viewed through a pair night vision goggles than they are in the scene 200b viewed with an unaided eye. As shown in FIG. 2b, trees 205b and dog 210b are almost completely occluded by the darkness of night in scene 200b. The only details that can be seen in scene 200b are details with large amounts of visible light. In this case, the moons 215a and 215b in scenes 200a and 200b respectively, are readily observable in both scenes. In fact, moon 215b may be the only detail the viewer of scene 200b may be able to discern with the unaided eye.

In situations such as this, the limitations of the night vision goggle may render one user unable to operate certain equipment or drive a vehicle. To allow the user of the night vision goggles greater capability, he or she may be paired up with another team member who can operate machinery or drive a vehicle. To be an effective team, the night vision member of the team and the unaided vision member of the team must practice and train to work as a unit to use the night vision imaging device in whatever situation they might employ the use of the night vision imaging device.

To practice operating as a team, many schemes and apparatus have been developed. One such traditional training apparatus is shown in FIG. 2c. FIG. 2c depicts a system that can display both an infrared image and a visible light image on the screen 280 and display the images to two or more users at the same time. For example, projector 250V can be used to project a low level visible light scene onto screen 280, while at the same time projector 2501R can be used to project an infrared image onto screen 280. For purposes of illustration, the scenes 200a and 200b can be the scenes projected onto screen 280. The scenes 200a and 200b are essentially overlaid on top of one another, however, only user 2701R wearing a pair of night vision goggles can see the infrared information of scene 200a, while user 270V will only be able to see the visible light information of scene 200b. With such a setup, users 2701R and in 270V can practice interacting and cooperating with the scenes displayed on screen 280 while viewing the different information available in the two scenes projected in the visible and the infrared spectra.

Although such setups are useful, they are less than ideal. The use of two projectors, 250V and 2501R, presents many problems including, but not limited to, the increased cost of requiring two projectors, spatial alignments of the two images projected onto screen 280, temporal alignment of the signals being fed to the two individual projectors and potential visible artifacts that may occur when using two separate imager devices in the two projectors. Embodiments of the present invention, alone and in combination, address these and other issues.

BRIEF SUMMARY

Systems and methods for interweaving infrared and visible moving image data using a single optical system and imager device based on an infrared input signal and a visible input signal are disclosed. Infrared image frames can be substituted for complete visible image input frames or for partial visible image input frames, i.e. substituting in an infrared image input frame for one or more of the color channels in one or more visible image input frames. Moving video or computer-generated moving or still graphics can include both infrared and visible image data. Visible image frames and infrared image frames can be displayed in an alternating fashion to display both infrared and visible content on the same display device. The system and method can be used in projection systems in night-vision imaging device team training simulators to reduce the cost of such systems, while increasing the ease of use and performance.

Various embodiments are direct to methods and systems for interweaving visible image data and infrared image data using an image processing computer. The image processing computer can be used to receive a first visible input signal, i.e. visible video or computer generated moving graphics, having a first frame rate and a first infrared input signal, i.e. infrared video or computer generated moving graphics, having a second frame rate. The image processing computer can then be used to process the first visible light input signal into a second visible light input signal having a third frame rate. The first infrared input signal can then be processed into a second infrared output signal having a fourth frame rate. Next, a combined output signal based on the second visible input signal and the second infrared input signal can be generated.

Other embodiments are directed to methods for interweaving visible image data and infrared image data using an image processing computer in which the image processing computer can receive a visible input signal having a plurality of color channel input data and an infrared input signal. The image processing computer can then be used to process the visible input signal and the infrared input signal into a combined output signal having a plurality of channel output data that can include data from the infrared input signal substituted in for data from the one or more of the color channels.

Yet other embodiments are directed to an image processing system for interweaving visible image data with infrared image data. The image processing system can include a color substitution processor configured to receive a visible input signal and an infrared input signal. The image processing system can also be configured to process the visible input signal and the infrared input signal into a combined output signal based on data contained in the visible input signal and having data from the infrared input signal substituted in for data contained in the visible input signal. The image processing system can also include an image processor coupled to the color substitution processor. The color substitution processor can be configured to receive the combined output signal and process the combined output signal into a plurality of sequential visible and infrared color channel frames. The color substitution processor can also be configured to control a light source sequencer to operate a plurality of visible and infrared light sources in synchronization with an imager device.

A better understanding of the nature and advantages of embodiments of the present invention may be gained with reference to the following detailed description and the accompanying drawings.

DETAILED DESCRIPTION

In many situations, the use of night vision imaging devices often occurs in teams of two or more in which one member of the team uses or monitors a night vision imaging device while others in the team receive information relayed by that member to operate equipment or vehicles using unaided vision. Mastering the skills necessary to strengthen the effectiveness of a team using night vision imaging devices and unaided vision takes practice and training. To avoid the dangers and pitfalls of practicing in the real world, teams can practice using simulators that display simulated infrared and visible scenarios with which the teams can interact. One such simulator is depicted in FIG. 2c.

Figure 1:
FIG. 1 is an example of a traditional night vision imaging device in the form of a pair wearable goggles.
Figure 2A:
FIG. 2a show a simulation of a scene as viewed with a night vision imaging device.
Figure 2B:
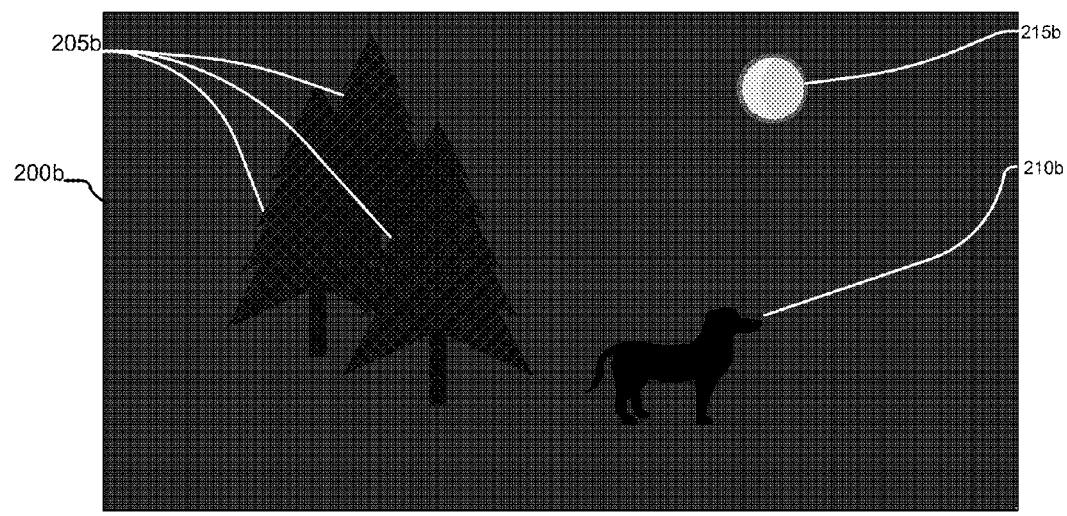
FIG. 2b simulates the scene in FIG. 2a as viewed with the unaided eye.
Figure 2C:
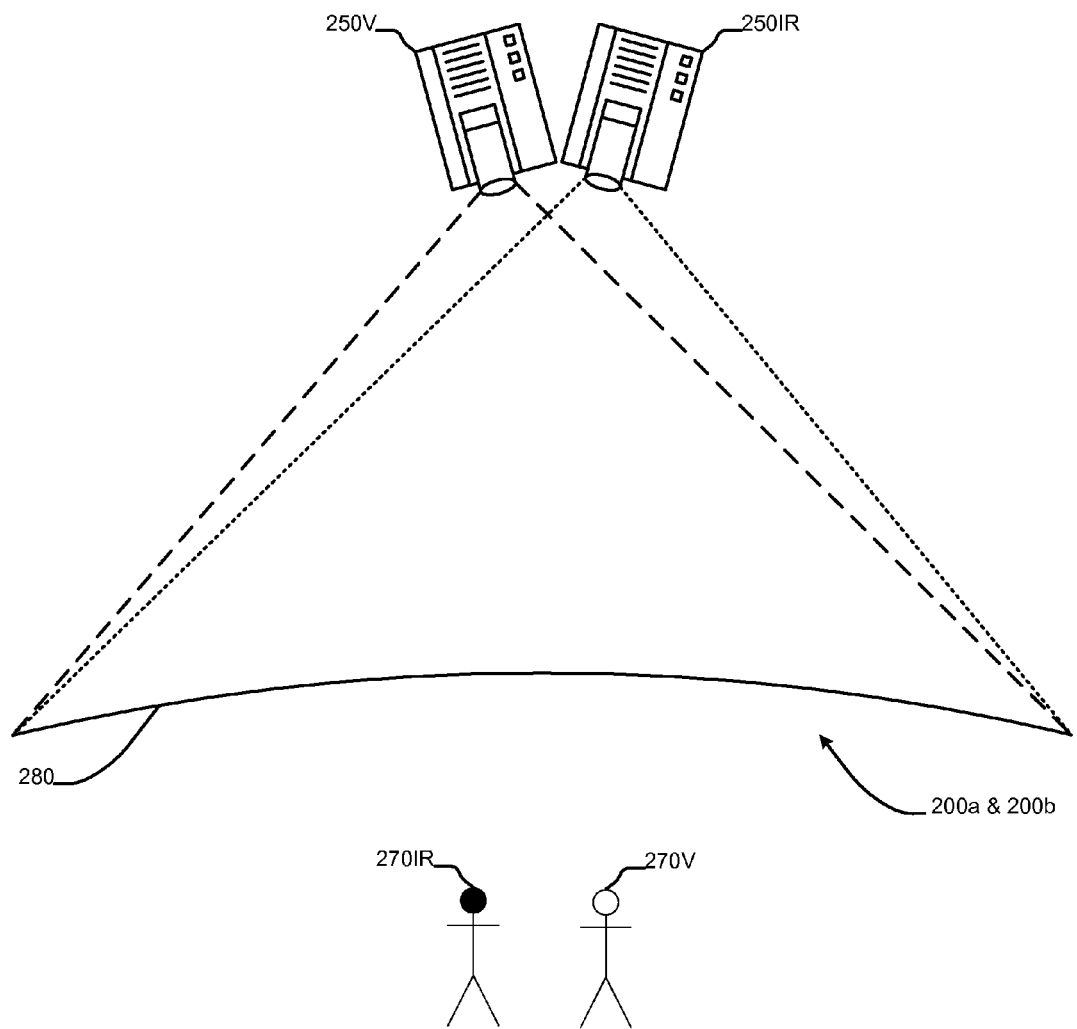
FIG. 2c is a schematic of a traditional simultaneous infrared and visible viewing training module.

Conventional infrared/visible simulators, like the one depicted in FIG. 2c, suffer from various deficiencies like temporal and spatial alignment problems as well as increased costs of using two separate imager devices or projectors. Embodiments of the present invention address these and other issues by providing systems and methods for interweaving infrared and visible images using a single imager device with a single optical system, thus reducing costs and alignment and timing issues associated with two projectors systems.

Figure 3:
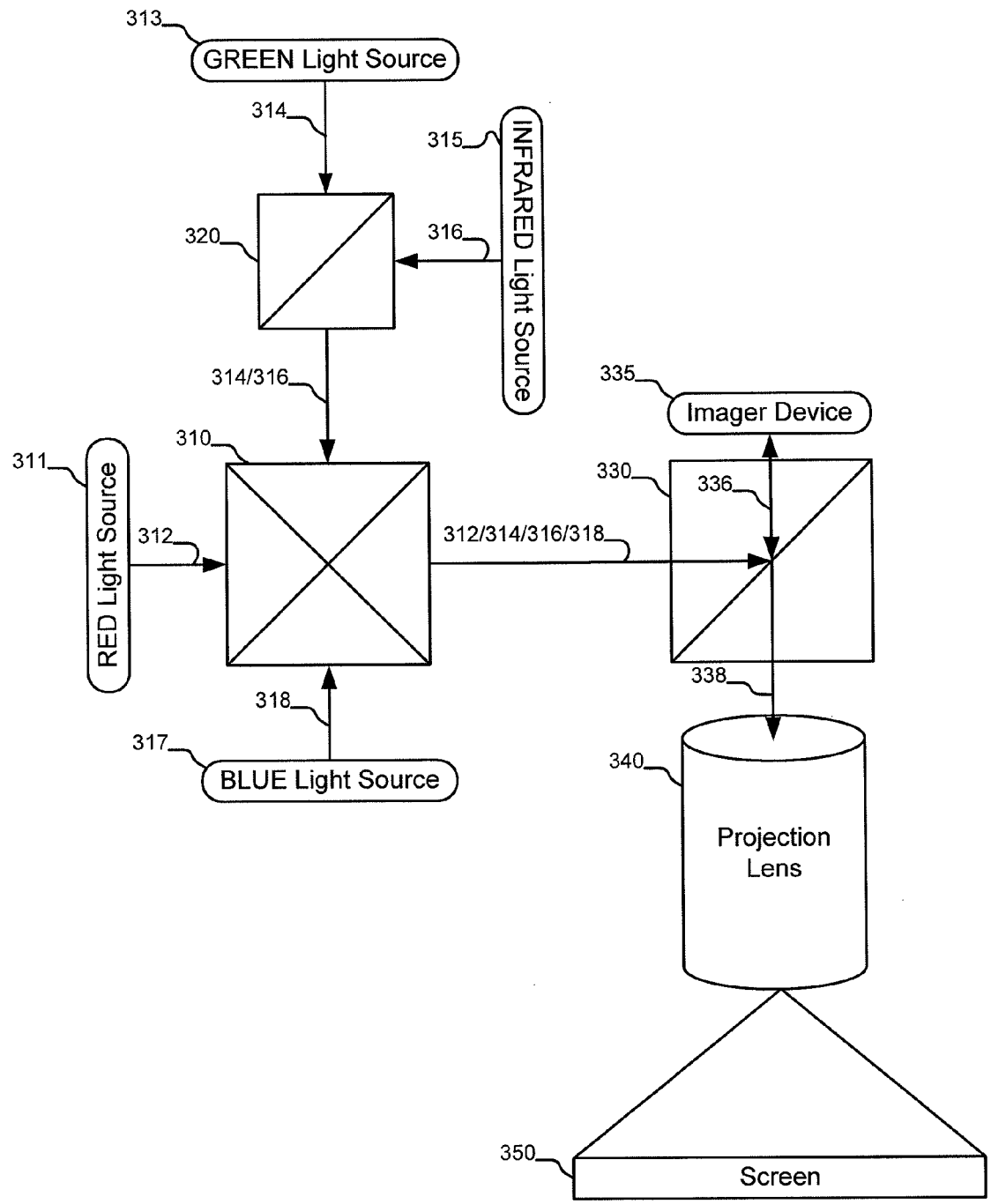
FIG. 3 is a block diagram of an optical train that can be used to mix visible and infrared light according to various embodiments of the present invention.

FIG. 3 shows a color mixing optical system 300 that can be used with various embodiments of the present invention. Optical system 300 can be used to provide visual images and infrared images by illuminating the imager device with several different light sources with different spectral outputs. The setup of optical system 300 provides a convenient way to use a single imager device to provide visible and infrared, still and moving images with few to no moving parts.

Optical system 300 can have three visible light sources and one infrared light source. Each light source can be turned on in sequence thus illuminating imager device 335, which can manipulate the light to produce an image that then can be projected or otherwise displayed on screen 350 using projection lens 340. For example, red light source 311 green light source 313 and blue light source 317 can be turned on in sequence and in coordination with the operation of the imager device 335. Imager device 335 can be operated to manipulate the light from the light sources, by reflection, polarization state changes or limited transmittance, to the produce images. As the light sources are turned on in sequence or scheme, the imager device 335 can quickly be arranged to produce the correct color channel of a complete image. In such setups, the optical system 300 relies on the persistence of human vision to mix the colors to produce a color image in the visible range. The addition of an infrared light source 315 allows the optical system 300 to inject infrared light into the system to include infrared image data in the projected image.

One possible sequence for operating the light sources can start with turning on the red light source 311 to send red light along path 312 through x-prism 310 into beam splitting prism 330 where it is reflected onto imager device 335 along path 336. Imager device 335 can then selectively reflect the red portions of the image back along path 338 through prism 330 to projection lens 340 onto screen 350. In some embodiments, the reflection of the image changes the polarization of the reflected light to an orientation compatible with passing through the beam splitting prism 330, in which case the beam splitting prism 330 can be a polarization beam splitting prism.

After the red light source 311 is turned on, it can be turned off and the green light source 313 can be turned on. Green light source 313 can then send green light along path 314 through infrared reflecting prism 320 and into x-prism 310, where the green light is reflected to beam splitting prism 330. From the beam splitting prism, the green light can illuminate imager device 335, which can selectively send the green components of an image along path 336, back through beam splitting prism 330 along path 338 to projection lens, from which the image can be projected onto screen 350.

Next, after the green light source 331 is turned off, the blue light source 317 can be turned on, sending blue light along path 318 into x-prism 310 where it can be reflected into beam splitting prism 330 and onto the imager device 335 as with the red and green light to finally be projected onto screen 350. The foregoing described light path and image generation steps can be repeated very quickly to combine the color channels into a single full color still or moving image using the persistence of human vision.

Finally, in embodiments in which infrared light is desirable, infrared light source 315 can be turned on to send infrared light along path 316 into infrared reflecting prism 320 to be reflected into x-prism 310. From x-prism 310, the infrared light can be reflected into beam splitting prism 330 onto imager device 335 along path 336 and then back along path 338 into projection lens 340 to project an infrared image onto screen 350.

The timing of the operation of the light sources 311, 313, 315 and 317 can be coordinated with the operation of the imager device 335 according to the image signals driving the imager device 335. Specifically, the operation of the light sources and the imager device can be repeated very quickly to display a single still image or a series of images to produce a moving image. The order of operation of the foregoing example is meant to be illustrative and should not be considered to be an exhaustive description of the use of optical system 300. Furthermore, the configuration of optical system 300 is only an example. Many other configurations of color mixing optical systems can be used with various other embodiments of the present invention.

In optical system 300, x-prism 310, infrared reflecting prism 320 and beam splitting prism 330 can be made of optical materials suitable to for transmitting light from the visible to the infrared with as little absorption as possible. Such optical materials can include, but are not limited to, glass, polycarbonate and acrylic elements with various levels of additives. In some embodiments, the indices of refraction, dispersion, birefringence and other optical properties can be selected to transmit and reflect light from all the light sources 311, 313, 315 and 317 to the imager device 335 and then the projection lens 340 to produce the desired image quality. Light sources 311, 313, 315 and 317 can be any light source suitable for providing a suitably shaped spectral output of light in the red, green, blue and infrared regions as required by the imager device 335, and the rest of the optical system 300, to produce a high quality image. In some embodiments, the light sources can be LEDs with or without integrated collimating optics. Imager device 335 can be selected for the desired response time, resolution and aspect ratio. The imager device can be a LCD imager device, LCOS imager device or a light processing imager device such as a Texas Instruments DLP™.

Figure 4A:
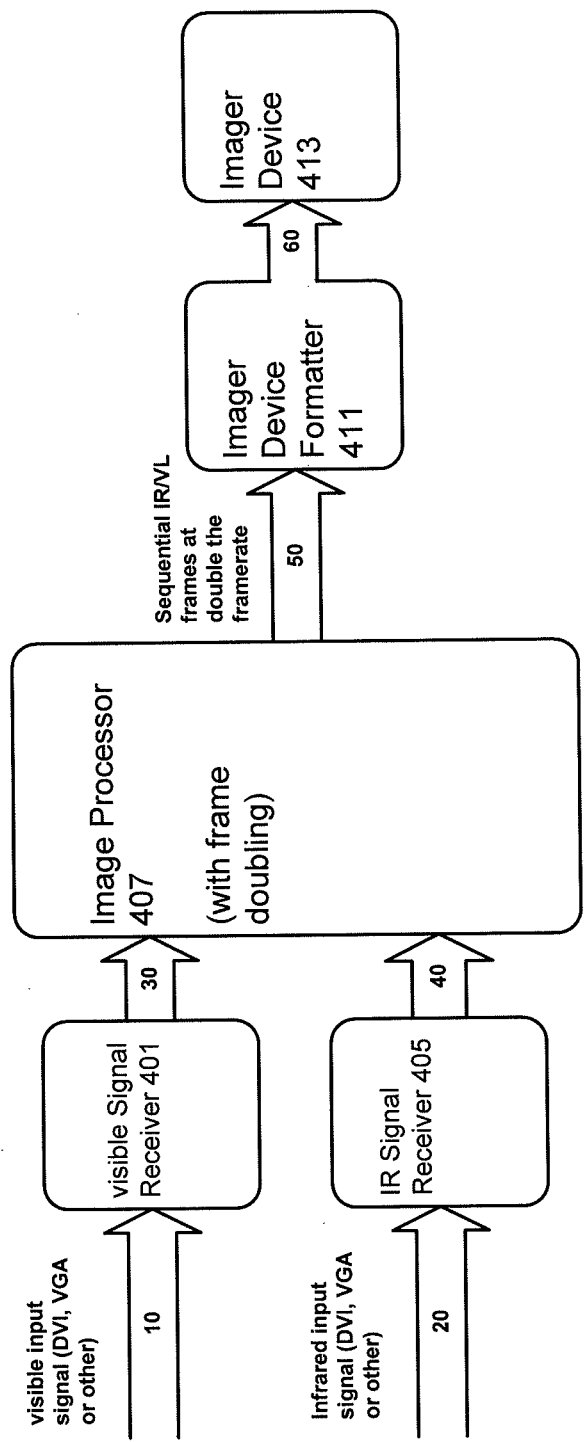
FIG. 4a is block diagram of a system for interweaving visible and infrared images according to various embodiments of the present invention.

FIG. 4a is a block diagram of a system 400 for interweaving infrared and visible image data contained in separate visible input and infrared input signals. System 400 can include, but is not limited to, a visible signal receiver 401, an infrared signal receiver 405, an image processor 407, an imager device formatter 411 and an imager device 413. In some embodiments, the modules of system 400 can be incorporated into a single printed circuit board with appropriate field programmable gate arrays or ASICs. In other embodiments, the modules of system 400 can be accomplished using software executed on a general-purpose computer having a processor, a memory and any necessary storage. Various modules of system 400 can be implemented as integrated circuits, software modules or a combination thereof. As used herein, the term interweaving refers to mixing or combining infrared and visible image data in any fashion. Interweaving infrared and color image signals can include interleaving frames of the signals, i.e. alternating infrared and visible frames in sequence at the same or higher frame rate. Additionally, interweaving can include substituting infrared image data in for one or more of the color channels of the frames of a color image signal.

Visible signal receiver 401 can receive a visible input signal in step 10. Similarly, infrared signal receiver 405 can receive an infrared input signal in step 20. The visible input signal and the infrared input signal can be received in parallel or in series. The visible input signal and infrared input signal can be DVI, VGA or other digital or analog image signals suitable for transmitting high-quality dynamic visible images. Once the visible signal receiver 401 and the infrared signal receiver 405 receive the visible input signals and the infrared input signals, each of the receivers can send the input signals to image processor 407.

Image processor 407 can receive the visible input and the infrared input signals at one or more frame rates and process the signals into a higher frame rate. For example, the visible input and the visible input signals can both be fed into the visible signal and infrared signal receivers at 60 Hz and image processor 407 can double the frame rate of each of the infrared and visible signal inputs to 120 Hz. In some embodiments, frames from the visible and infrared input signals are fed into a buffer in image processor 407 to facilitate the frame rate increase. In such embodiments, the buffer allows the image processor increase the frame rate of one input signal while the other is held in the buffer. Although the following example can be described as image processor 407 doubling the frame rate of the input signals, various other embodiments of the present invention can accept visible and infrared input signals with higher or lower frame rates and increase the frame rate of each signal by the same or different amounts.

To double the frame rate of the visible signal and infrared signal, image processor 407 can reduce the duration of each frame in the input signals in half. Again, a buffer in image processor 407 can be useful to facilitate the frame rate doubling. Once the duration of each frame of the processed visible and infrared input signals are only half the duration of the frames of the input signals, frames from the processed visible input signal and the processed infrared input signal can be alternated to produce a combined output signal having both visible and infrared image data. Each 60 Hz frame of the combined output signal can combine a half duration visible frame and a half duration infrared frame. In some embodiments, the reduced duration frames can be fed into another buffer to await further processing or transmission. Alternatively, the combined output signal can be immediately viewed as a 120 HZ signal with interweaved visible and infrared images.

Image processor 407 can then send the sequential infrared/visible output signals with frames having half visible data and half infrared data to an imager device formatter 411 in step 50. Imager device formatter device 411 can format the combined output signal into the proper voltages, control and timing signals that can be sent to imager device 413 and the visible and infrared light sources (not shown). The control and timing signals can include coordination and temporal synchronization signals to operate the infrared and visible light sources in synchronization with the operation of imager device 413. The control signal can then be sent to the imager device 413 in step 60.

In yet other embodiments, image processor 407 can receive an image input signal, or combined input signal, already having the interweaved infrared and visible image data. In such embodiments, the combined image signal can be generated by computer separate from the image processor 407 or provided by a prerecorded or otherwise stored video file on a DVD, CD, video tape, computer file, etc. In embodiments in which the image input signal already has the infrared and visible signals combined, the image processor 407 can process the signal to extract the necessary information to operate the imager device and light sources to produce the desired output using an optical system, such as optical system 300. The image processor can process the combined image signal to display it in its native frame rate, or increase or decrease the frame rate according to the desired use of the output image. For example, a 120 Hz combined input signal can be displayed at 120 Hz or slowed down to 60 Hz with appropriate processing.

Figure 4B:
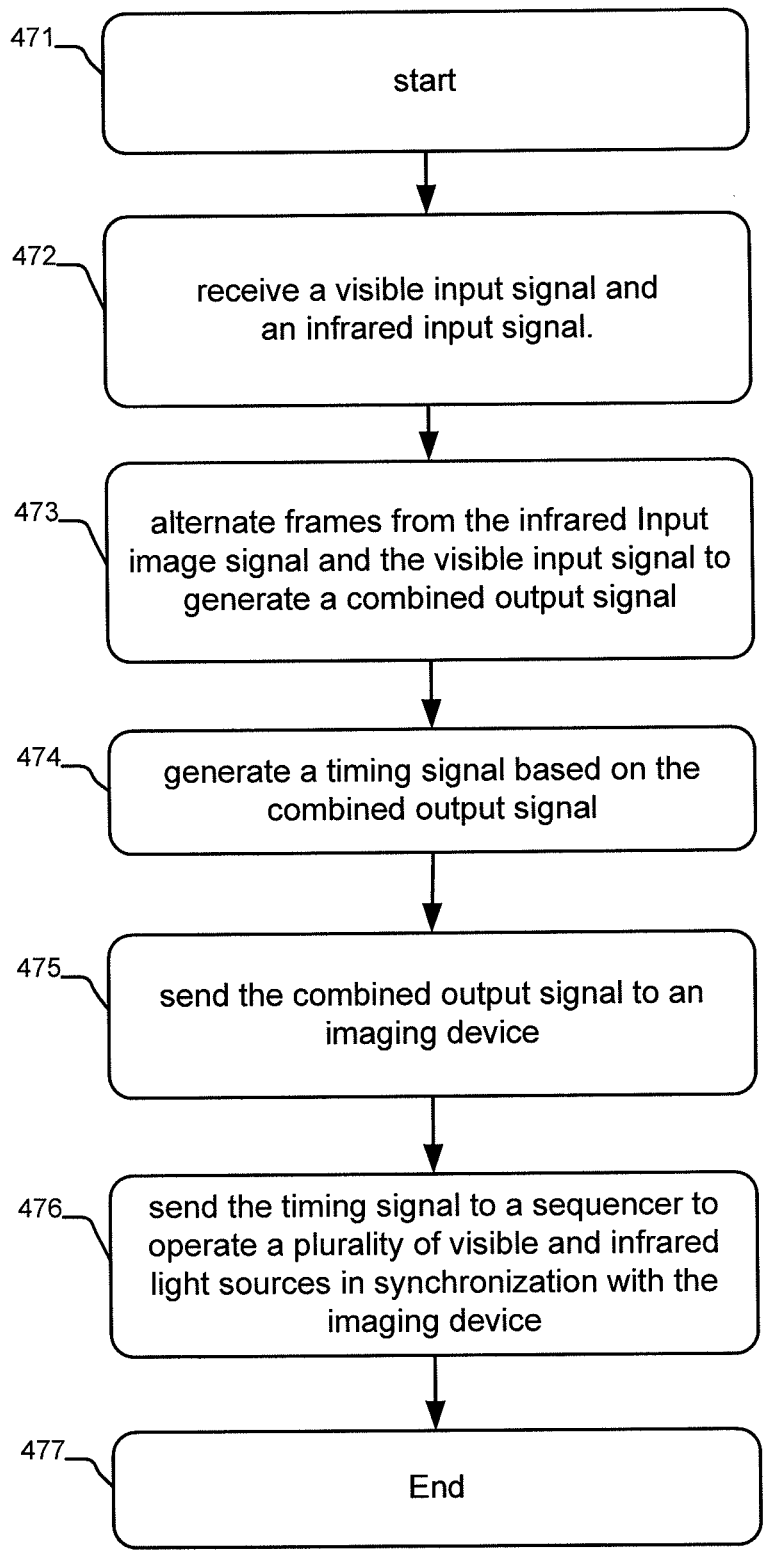
FIG. 4b is a flowchart of a method for interweaving visible and infrared images according to various embodiments of the present invention.

FIG. 4b is a flowchart of a method 470 for operating system 400 according to various embodiments of the present invention. The method can start at step 471 in which system 400 is powered up or initiated by receiving visible and infrared input signals or other initiation signal. System 400 can then receive a visible input signal and an infrared input signal in step 472. In some embodiments, the two input signals can be received in parallel or in series according to the input signals available to the system. Next, frames from the infrared input signal and the visible input signal can be alternated into a combined output signal in step 473, e.g. with image processor 407. The combined output signal can have a frame rate higher than the visible and infrared input signals, as described above. In step 474, a timing signal can be generated based on the combined output signal. The timing signal can include information and control signals to operate visible and infrared light sources as well as operate an imager device. The combined output signal and the timing signal can be digital or analog signals according to the needs of the light source control circuitry and imager device.

In step 475, the combined output signal can be sent to an imager device or imager device circuit or formatter that can format the combined output signal into the appropriate voltages and signal shape required by the imager device. In step 476, the timing signal can be sent to a sequencer to operate visible and infrared light sources in synchronization with the operation of the imager device. As previously described, the imager device 413 can be can be an appropriate light processing module such as a transmissive or reflective LCD micro-display, an LCOS micro-display or a light processing engine such as a Texas instruments DLP chip. Method 470 can then be repeated for new visible and infrared input signals or it can be ended in step 477.

Figure 4C:
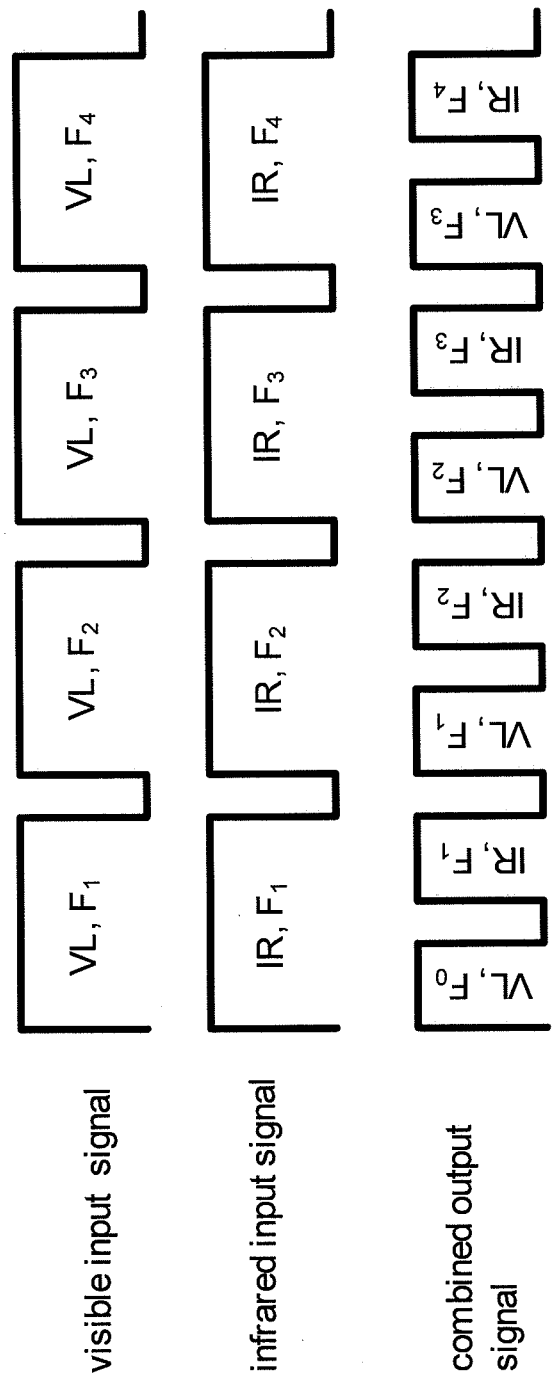
FIG. 4c is a timing diagram for interweaving visible and infrared images according to various embodiments of the present invention.

Diagram 480 in FIG. 4c is a timing diagram of the visible input signal, the infrared input signal and the combined output signal received by and generated by an image processor according to an embodiment of the present invention. As shown, the visible input signal and infrared input signals can have equal or similar frame rates with sequential corresponding frames lining up with frames in the other. For example, the visible input frames and the infrared input frames can all start and end at the same time and thus have the same frame rate. Alternatively, the visible input signal and infrared input signals may have the same frame rate but may be out of sync with one another.

In such embodiments, an image processor may be used to synchronize the visible input and the infrared input signals, however such a synchronization may not always necessary. To combine the visible input signal and the infrared input signal, an image processor can increase the frame rate of each of the input signals. As shown in the example of a timing diagram 480, the frame rates of the visible input signal and the infrared input signal can be increased approximately by a factor of two and then alternately combined into the combined output signal. As long as the order of the frame and the coordination of the frames is possible, the visible and the infrared input signal do not need to be synchronized.

As shown, the combined output signal can begin with a visible frame, $VLF_0$, which is then followed by an infrared frame, $IRF_1$, which in turn is followed by another visible frame, $VLF_1$. Frames from the visible input signal and infrared input signal can be continuously alternated into the combined output signal for as long as there is data in the visible and infrared input signals. In other embodiments, it is possible to begin the combined output signal with an infrared frame.

Figure 4D:
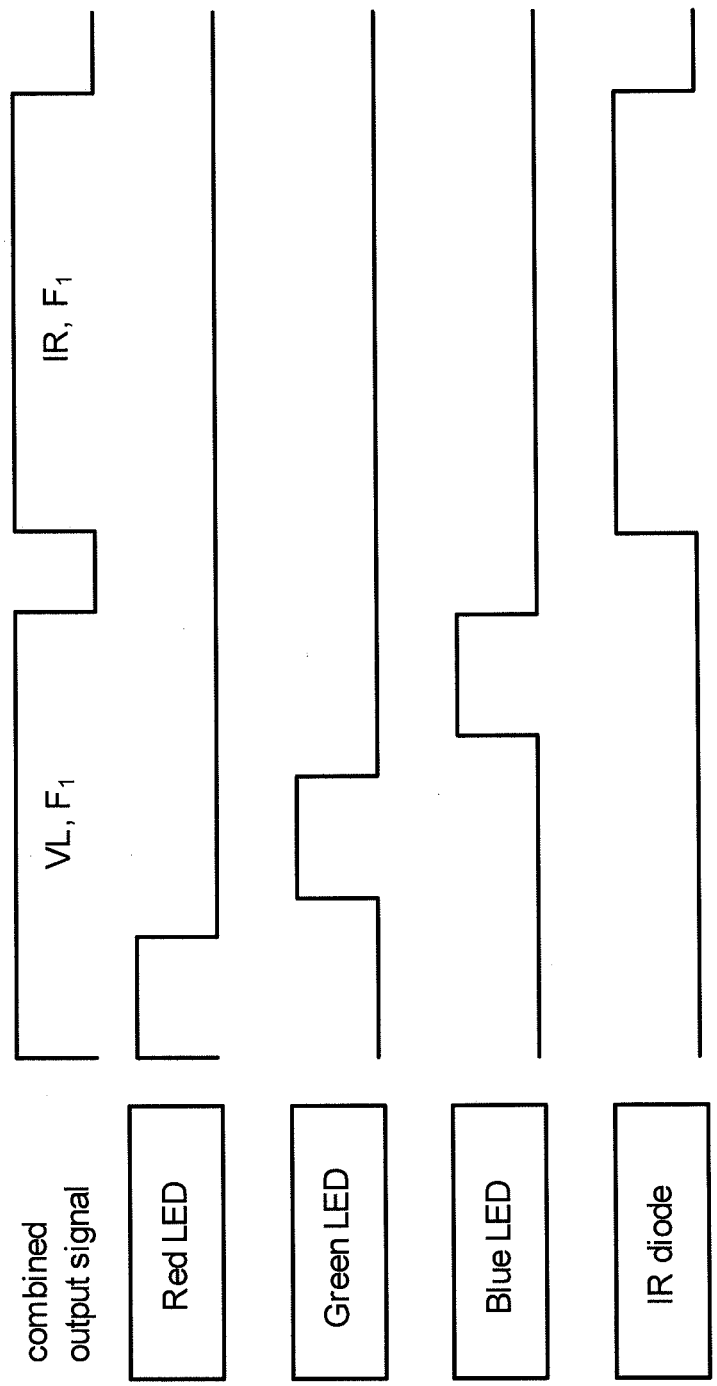
FIG. 4d is a timing diagram for controlling visible and infrared light sources for interweaving visible and infrared images according to various embodiments of the present invention.

Diagram 490 shown in FIG. 4d is a timing diagram of the timing signal that can be used to coordinate or control the visible and infrared light sources to produce a combined infrared and visible display image. As shown, the first visible frame can include pulses of light from three visible light sources. In this particular example, the visible light sources can be red green and blue LED light sources with appropriately shaped output spectra. The particular output spectra of the red, green and blue LED light sources can depend on many factors including the spectral response of the imager device used as well as any spectrum shaping dichroic filters or reflectors used in the particular optical train used to mix the light sources and project the resulting image.

The first visible frame and combined visible output signal can include information having red, green and blue components. In such cases, each visible light source has to be turned on in sequence in coordination with the operation of an imager device. The first visible frame, $VLF_1$, can have information having first red image information, then green image information and finally blue image information thus segmenting $VLF_1$ further into three time frames in which the red, green and blue LEDs must be turned on in coordination with the imager device controlled by the combined output signal.

Next, the infrared diode, or other infrared light source, can be turned on while the first infrared frame, $IRF_1$, of the combined output signal is used to operate the imager device. In this way, infrared light can illuminate imager device while the imager device is arranged to reflect or transmit the infrared portion of the combined output signal contained in $IRF_1$. Since the combined output signal can contain alternating visible and infrared image frames, the process repeats at a frame rate suitable for the image quality and capability of the users and the night vision device that will be used in training systems, devices and methods according to various embodiments of the present invention.

Figure 5A:
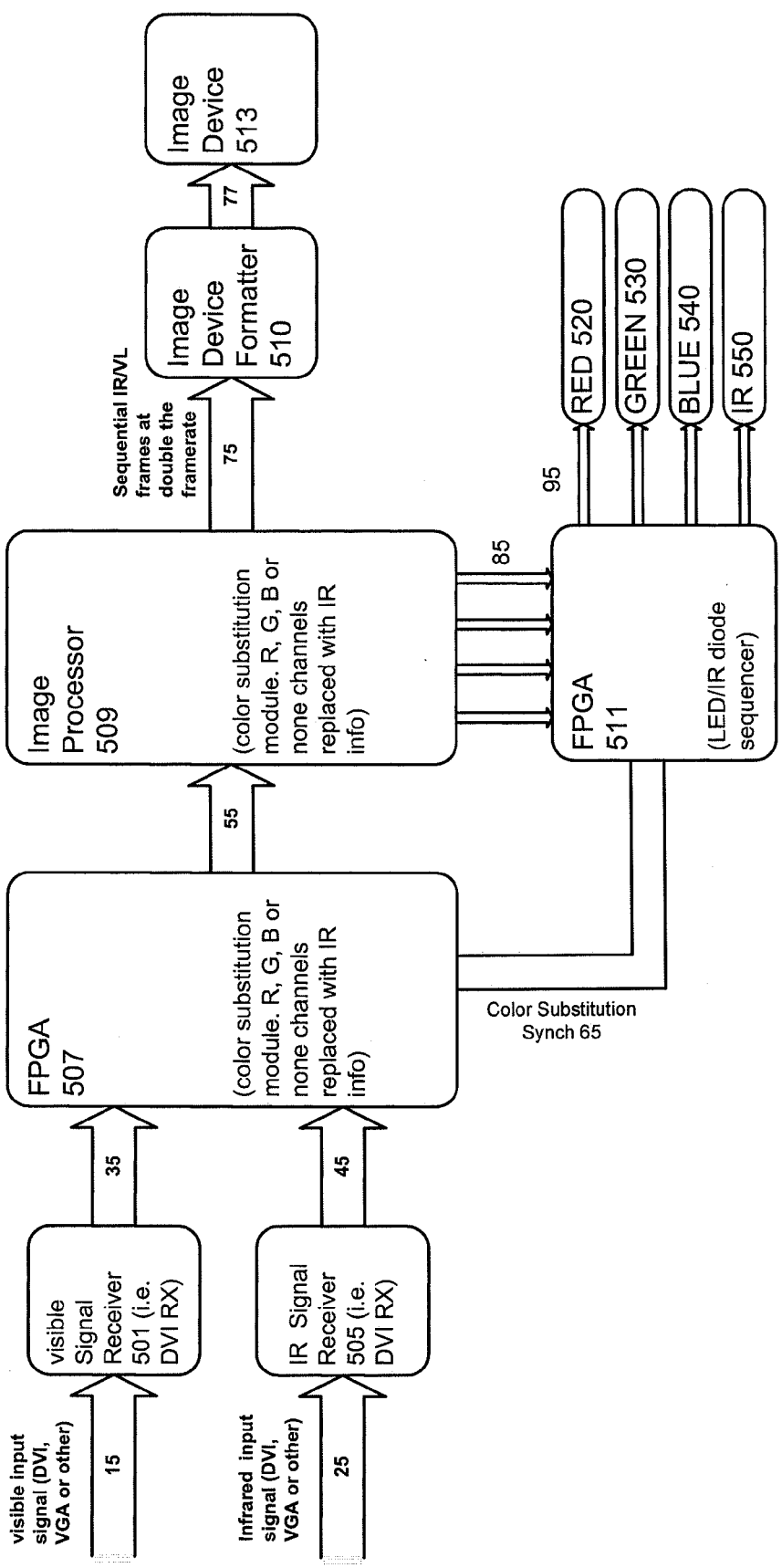
FIG. 5a is block diagram of a system for interweaving visible and infrared images according to various embodiments of the present invention.

FIG. 5a shows a system 500 for interweaving visible and infrared images according to various embodiments of the present invention. System 500 can be used for substituting infrared image data from a infrared input signal for one of the color channels of the visible input signal. Similar to system 400, system 500 can receive a visible input signal using the visible signal receiver 501 in step 15 and to receive and infrared input signal using infrared signal receiver 505 in step 25. The visible input and infrared input signals can be received in parallel or in series depending on the capabilities of the visible input and infrared input signal sources and other factors.

Once the visible and infrared input signals are received by system 500, visible signal receiver 501 can pass the visible input signal to an FPGA 507, or other color substitution processor, in step 35. Similarly, the infrared signal receiver 505 can pass the infrared input signal to FPGA 507 in step 45. In some embodiments, the visible signal receiver 501 and the infrared signal receiver 505 can communicate with FPGA 507 in parallel or in series. In some embodiments, FPGA 507 can be replaced with an ASIC or other dedicated circuit suitable for substituting infrared image data from the infrared input signal into one of the color channels of the visible input signal. In another embodiment, image processor 509 can perform the color substitution.

FPGA 507 can perform various color substitution functions including, but not limited to, substituting a frame from the infrared input signal into one or more of the color channels of one or more frames of the visible input signal. For example, the visible input signal can include three color channels such as a red, green, and blue color channels. FPGA 507 can replace one of the color channels, for instance, the blue color with image data from the infrared input signal for a corresponding frame.

The particular color channel replaced can be determined by FPGA 507 or image processor 509 and/or can be determined based on a periodic scheme or determined by the color content of a particular frame in the visible input signal. For instance, a particular frame in the visible input signal may have very little blue color channel information, therefore FPGA 507 can be configured to determine the blue color channel should be replaced with the infrared information from the corresponding frame in the infrared input signal. In this way, the least amount of information in the visible input signal would be replaced with information from the infrared input signal, thus creating the least noticeable difference in the visible image data. FPGA 507 can continuously process the incoming visible input and infrared input signals to replace one or more of the color channels of the visible input signal with information from the infrared input signal into a combined image signal in step 55.

The FPGA 507 can send a combined image signal to image processor 509 in step 55. Image processor 509 can process the combined image signal to render the substitute output signal into an image input signal or extract synchronization data.

Image processor 509 can then send a combined image signal to the image device formatter 510 in step 75. Image processor 509 can also send synchronization data to FPGA 511 to synchronize the operation of light sources red 520, green 530, blue 540 and infrared 550 with the operation of image device 513. In some embodiments, image processor 509 can send the combined image signal to image device formatter 510 in step 75. Image device formatter 510 and can further process the combined image signal into a signal suitable for operating image device 513 in step 77. In other embodiments, image device formatter 510 can be omitted and image processor 509 can send a combined image signal directly to image device 513.

Image processor 509 can send the combined image signal directly or indirectly to image device 513 and can send synchronization data to FPGA 511 to activate the appropriate light source in coordination with the operation of image device 513. For example, as image device 513 is configured to display the red channel, green channel, blue channel or the infrared data substituted in for one of visible input signal channels, the appropriate light source can be activated so as to illuminate the image device 513 with the appropriate light source.

Figure 5B:
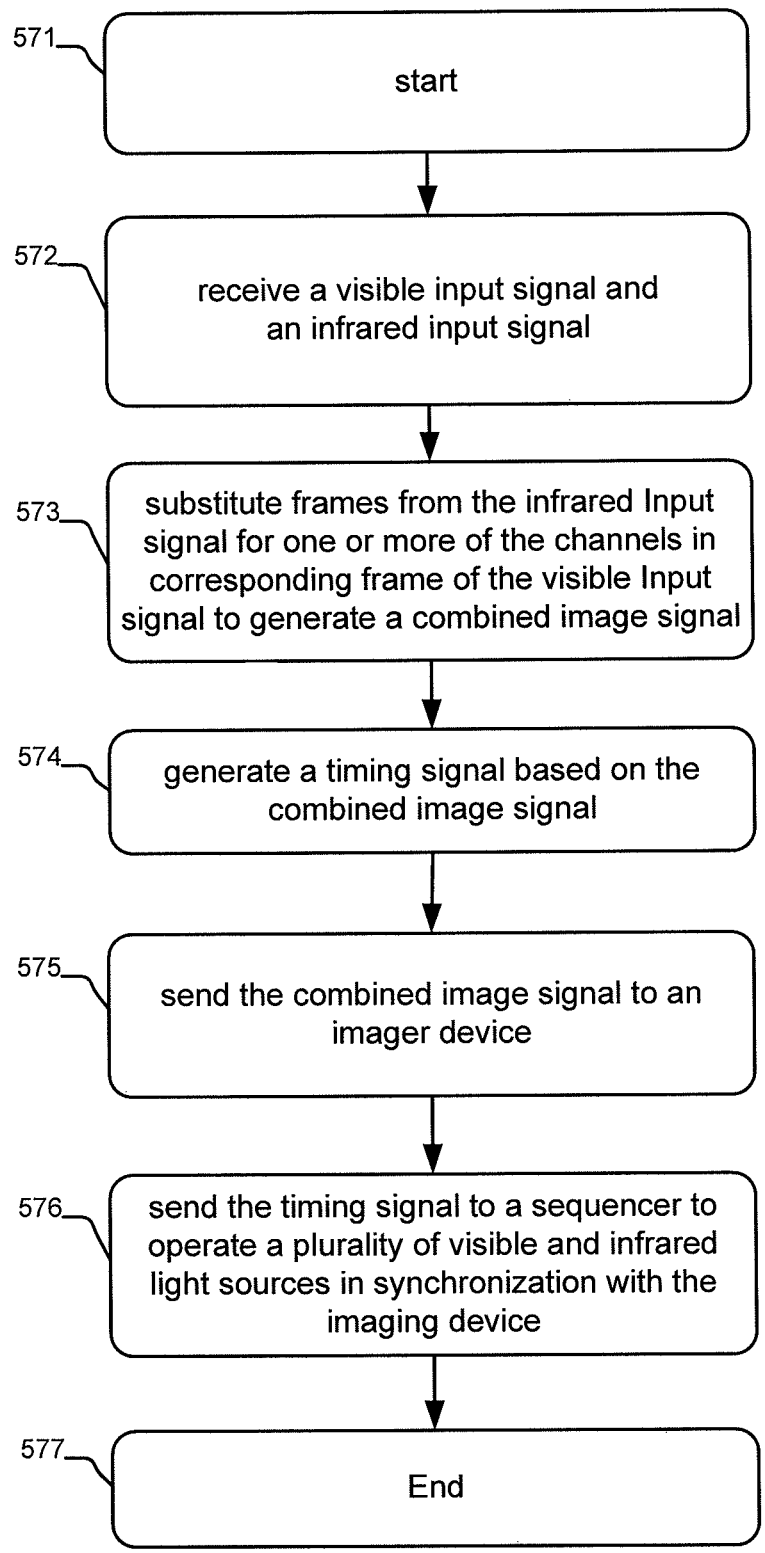
FIG. 5b is a flowchart of a method for interweaving visible and infrared images according to various embodiments of the present invention.

FIG. 5b shows a method 570 for interweaving visible and infrared image data by substituting an infrared image data into one or more of the color channels of visible input data. The method starts at step 571 with a suitable initiation message. In step 572, a visible input signal and an infrared input signal can be received. The visible and infrared input signals can be received in parallel or in series. Once the visible and infrared input signals are received, frames from the infrared input signal can be substituted in for one or more of the color channels in the visible input signal to generate a combined image signal in step 573. In addition to generating any combined image signal, the timing signal based on the combined image signal can be generated in step 574. The timing signal can be used control one or more control circuits, such as FPGA 511 to synchronize the operation of visible and infrared light sources in coordination with an imager device.

In step 575 the combined image signal can be sent to an imager device and the timing signal to be sent to a sequencer, like FPGA 511, to operate the visible and infrared light sources in synchronization with the imager device as controlled by the combined image signal. Steps 572, 573, 574, 575 and 576 can be repeated until all visible and infrared input signals have been processed. Finally, method 572 can end at step 577.

Figure 5C:
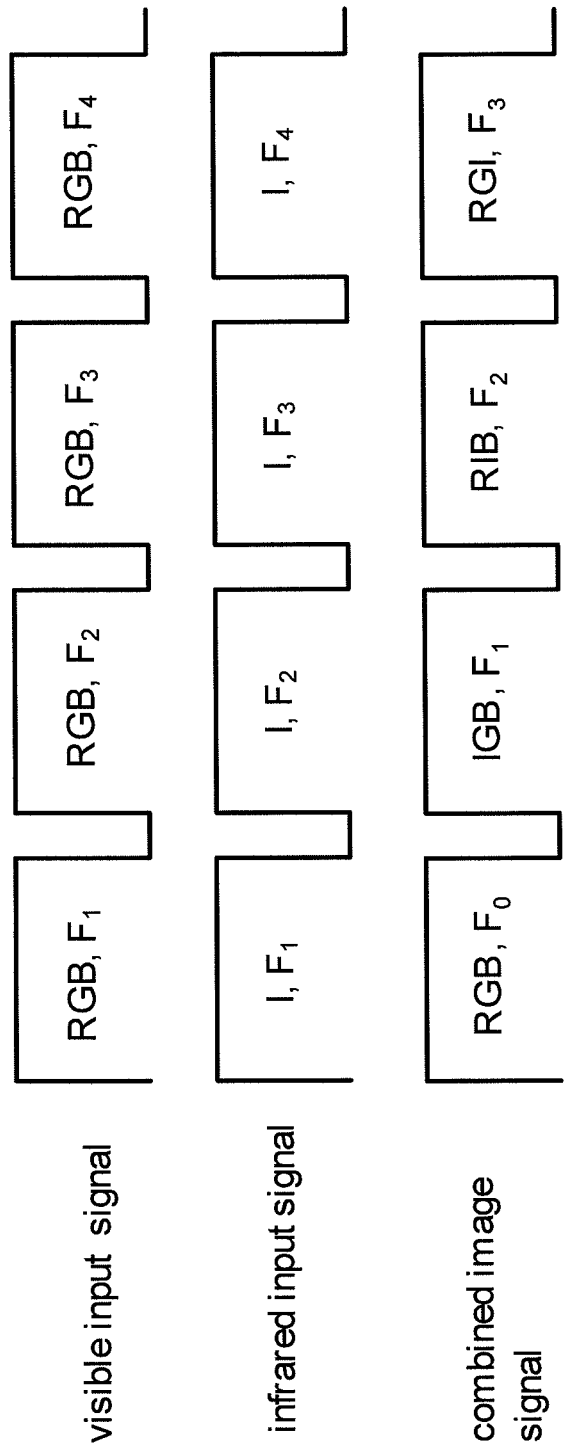
FIG. 5c is a timing diagram for interweaving visible and infrared images according to various embodiments of the present invention.

FIG. 5c shows a timing diagram 580 comparing the contents and/or the frames of a visible input signal, infrared input signal and the resulting combined image signal in which the infrared input signal data has been substituted in for one or more of the color channels for the visible input signal data. As shown, the visible input signal can include a number of frames having red, green and blue, (RGB), color channels. Here the frames $RGB_1F_1$, $RGB_1F_2$, $RGB_1F_3$ and $RGB_1F_4$ in the timing diagram 580 are shown as a sample of a visible input signal. The frames $I_1F_1$, $I_1F_2$, $I_1F_3$ and $I_1F_4$ in the timing diagram 580 are shown as a sample of an infrared input signal. According to one embodiment of the present invention, information from the frames in the infrared input signal can be substituted in for one of the color channels in the visible input signal to generate the combined image signal, shown here as a sample frames $RGB_1F_0$, $IGB_1F_1$, $RIB_1F_2$ and $RGI_1F_3$. In this example, infrared image data from a frame is inserted sequentially into the color channels of the corresponding visible input signal frame.

As shown, the first frame of the infrared input signal is first inserted or substituted for the red channel of the first frame of the visible input signal. The second frame of the combined image signal includes the second frame of the infrared input signal substituted in for the green channel of the second frame of the visible input signal. Finally, the third frame of the combined image signal includes the third frame of the infrared input signal substituted in for the blue channel of the third frame of the visible input signal.

In some embodiments, this process can be repeated over and over again for the length of visible input signal and infrared input signal. In other embodiments, every so often, a full visible input signal frame can be shown as a frame of combined image signal with no infrared input information substituted in. An example of this is shown in frame 0 in which the combined image signals first frame includes the red, green and blue channels, $RGB_1F_0$, of the first frame of the visible input signal.

In other embodiments, the color channel of a particular frame and visible input signal for which the infrared input signal frame is substituted can depend on the image information contained in the particular frame of the visible input signal. For example, a particular frame individual input signal might contain only green color channel information, therefore it may not be advantageous to replace the green channel information with infrared information from the corresponding frame. Doing so results in a frame that cannot be seen with the naked eye. On the other hand, if there is little to no blue channel data to particular frame of the visible input signal, substituting the infrared image data from the corresponding frame into the blue channel would cause little change to the visible input signal image.

Figure 5D:
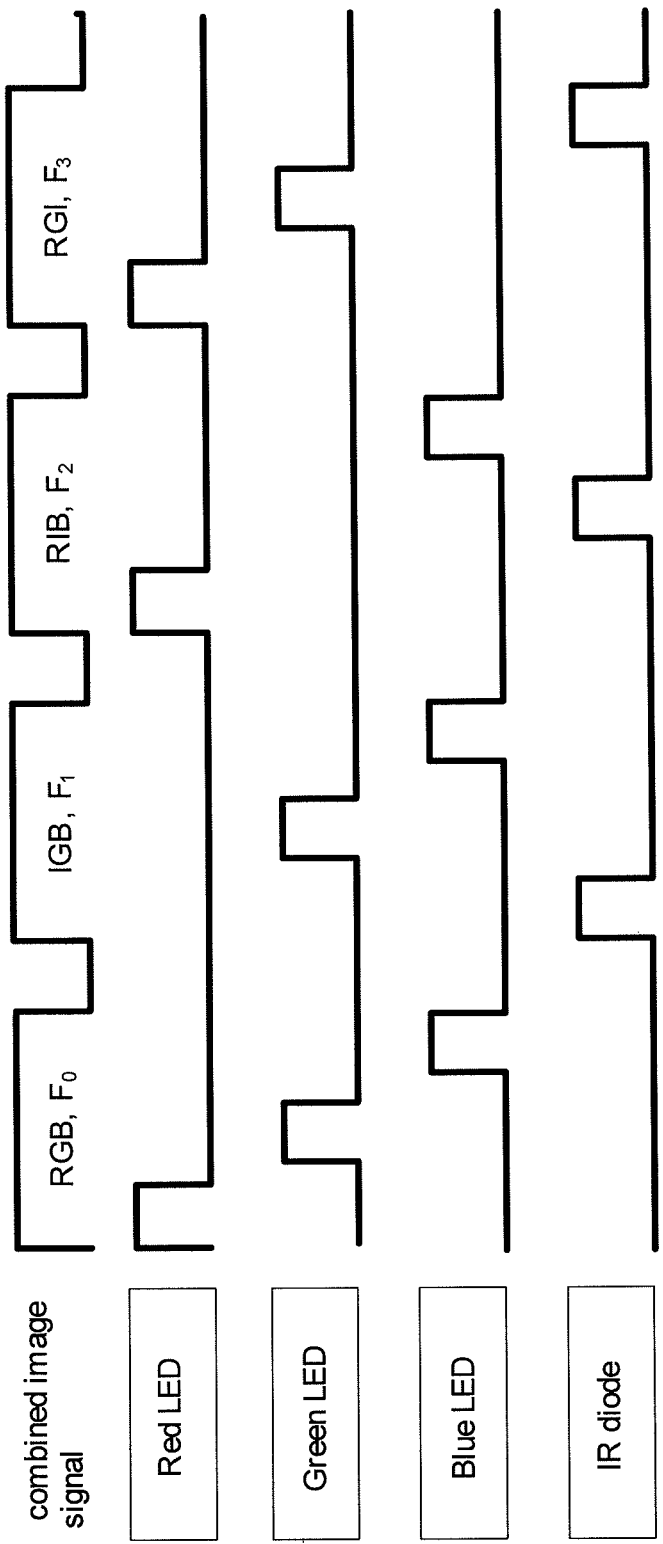
FIG. 5d is a timing diagram for controlling visible and infrared light sources for interweaving visible and infrared images according to various embodiments of the present invention.

FIG. 5*d* shows a timing diagram 590 comparing timing of the information contained in the frames of combined image data with the operation of the red, green, blue and infrared light sources. In this particular example, the visible light sources can be a red LED, a green LED and a blue LED while the infrared light source can be an infrared diode. Other light sources can be used if they provide a suitably shaped spectral output with a sufficient response time for the optical train, including spectrum shaping filters and reflectors, in which the light sources will be used.

The first frame of the combined image signal, $RGB_1F_0$, includes only visible image data, therefore only the visible light sources will be needed to illuminate the imager device. The red LED, the green LED and the blue LED can be turned on in sequence in synchronization with the operation of the imager device according to the data in frame $RGB_0F_0$. The sequence in which the color channels can include any sequence of the LEDs and the imager device color channel data. For example, the $RGB_1F_0$ frame in diagram 590 in FIG. 5*d* shows that the red LED is turned on and the red color channel data is sent to the imager device first, then the green and then the blue. In other embodiments, the green or the can be first with the other two color channels following in any order.

The next frame in the combined image signal, $IGB_1F_1$, can include infrared image data substituted in for the previously red color channel image data. As such, the infrared diode can be turned on in place of the red LED and the infrared image data for the frame can be sent to the imager device in place of the red color channel image data from the visible input signal from which the combined image signal was derived. Then, according to the scheme with which the combined image signal was derived, the next frame can have infrared image data from the infrared input signal substituted in for one of the other visible input signal color channels. In the example shown in FIG. 5*d*, the next frame, $RIB_1F_2$, the infrared image data can be substituted for the green color channel. Accordingly, the infrared diode can be turned on in place of the green LED in synchronization with the infra image data from the combined image signal being sent to the imager device. Finally, the last frame, $RGI_1F_3$, of the example shows the infrared image data being substituted in for the blue color channel and corresponding operation of the red, green and infrared diodes in synchronization with the visible and infrared image data being sent to the imager device.

Figure 6:
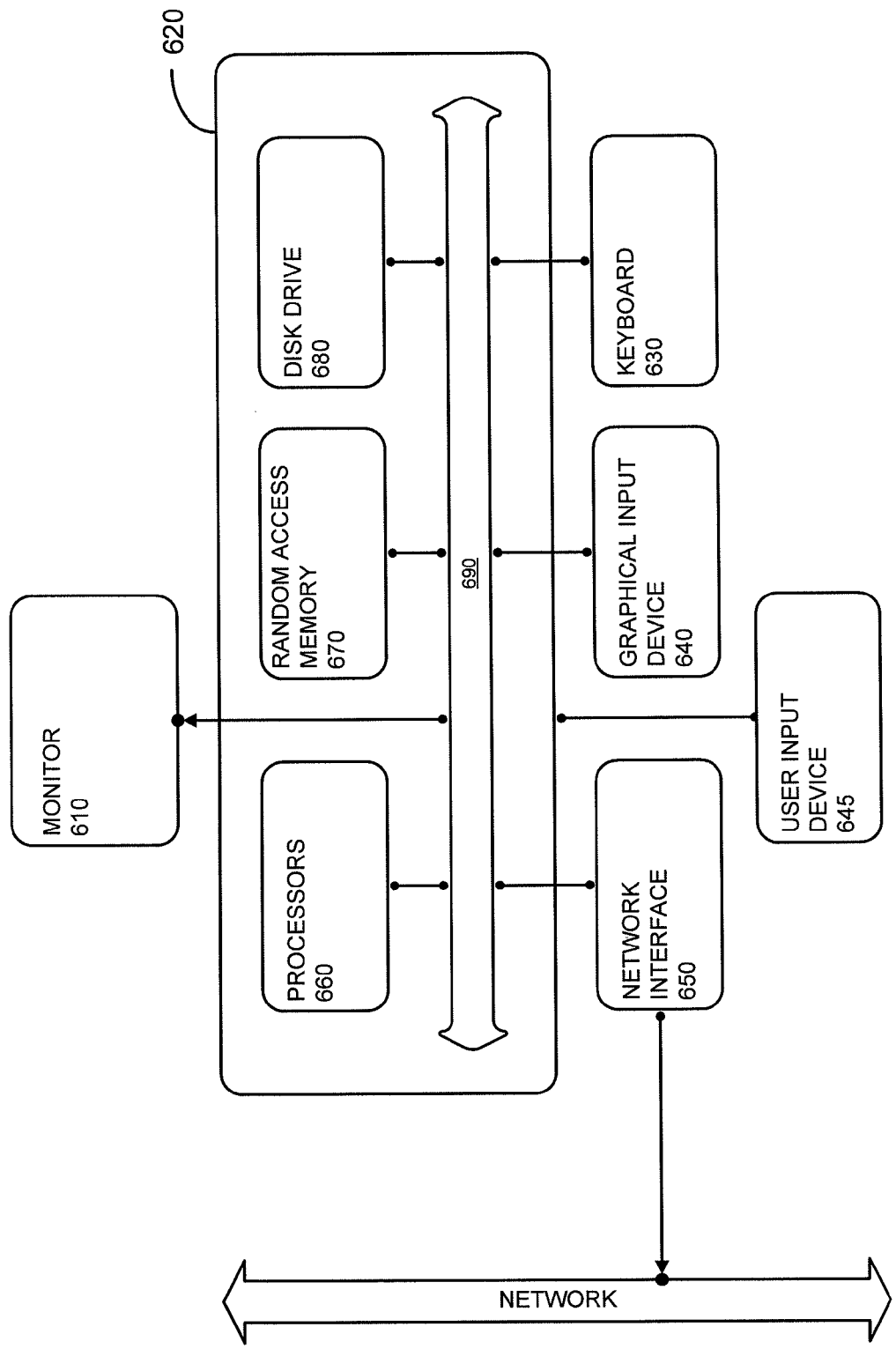
FIG. 6 is block diagram of a computer that can be used to implement various embodiments of the present invention.

FIG. 6 is a block diagram of typical computer system 600 configured to execute computer readable code to implement various functions and steps according to various embodiments of the present invention.

System 600 is representative of a computer system capable of embodying the present invention. The computer system can be present in any of the elements in FIGS. 4*a* and 5*a*, including the image processor 407, image device formatter 411, image processor 509, image device formatter 510, and the corresponding visible and infrared signal receivers described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 600 typically includes a display 610, computer 620, a keyboard 630, a user input device 640, communication or network interface 650, and the like. In various embodiments, display (monitor) 610 may be embodied as a CRT display, an LCD display, a plasma display, a direct-projection or rear-projection DLP, a micro-display, or the like. In various embodiments, display 610 may be used to display user interfaces and rendered images.

In various embodiments, user input device 640 is typically embodied as a computer mouse, a trackball, a track pad, a joystick, wireless remote, drawing tablet, voice command system, and the like. User input device 640 typically allows a user to select objects, icons, text and the like that appear on the display 610 via a command such as a click of a button or the like. An additional specialized user input device 645, such a magnetic stripe, RFID transceiver or smart card reader may also be provided in various embodiments. In other embodiments, user input device 645 include additional computer system displays (e.g. multiple monitors). Further user input device 645 may be implemented as one or more graphical user interfaces on such a display.

Embodiments of computer interfaces 650 typically include an Ethernet card, a modem (telephone, satellite, cable, ISDN), (asynchronous) digital subscriber line (DSL) unit, FireWire interface, USB interface, and the like. For example, computer interfaces 650 may be coupled to a computer network, to a FireWire bus, or the like. In other embodiments, computer interfaces 650 may be physically integrated on the motherboard of computer 620, may be a software program, such as soft DSL, or the like.

RAM 670 and disk drive 680 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks or removable hard disks; optical storage media such as CD-ROMS, DVDs, holographic memories or bar codes; semiconductor media such as flash memories, read-only-memories (ROMS); battery-backed volatile memories; networked storage devices, and the like.

In the present embodiment, computer system 600 may also include software that enables communications over a network such as the HTTP, TCP/IP, RTP/RTSP protocols and the like. In alternative embodiments of the present invention, other communications software and transfer protocols may also be used, for example IPX, UDP or the like.

In various embodiments, computer 620 typically includes familiar computer components such as a processor 660, and memory storage devices, such as a random access memory (RAM) 670, disk drives 680, and system bus 690 interconnecting the above components.

In some embodiments, computer 600 includes one or more Xeon microprocessors from Intel. Further, in the present embodiment, computer 620 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be the second frame with one or more features of any other embodiment without departing from the scope of the invention.

A recitation of "a", "an" or "the" is intended to mean "one or more" unless specifically indicated to the contrary.

What is claimed is:

1. A method for interweaving visible image data and infrared image data using an image processing computer, the method comprising:

using the image processing computer to receive a visible light input signal, each frame of the visible light input signal having a plurality of color channels;

using the image processing computer to receive an infrared input signal, the infrared input signal for displaying infrared images in synchronization with an infrared light source;

using the image processing computer to process the visible light input signal and the infrared input signal into a combined output signal having a plurality of channel output data;

wherein the plurality of channel output data includes data from the infrared input signal substituted for data from one of the plurality of color channels in the visible light input signal for each of a plurality of frames, further wherein the plurality of color channels comprises a red channel, a green channel and a blue channel; and wherein data from the infrared input signal is sequentially substituted in for the red channel, the green channel or the blue channel, such that:

in a first frame of three sequential frames, the red channel is substituted with the infrared input signal, in a second frame of three sequential frames, either the green channel or the blue channel is substituted with the infrared input signal, and in a third frame of three sequential frames, the remaining color channel is substituted with the infrared input signal.

2. The method of claim 1, wherein the data from the infrared input signal is sequentially substituted in at intervals.

3. The method of claim 2 wherein the intervals are determined by the image processing computer and based on the visible light input signal, the infrared input signal or both.

4. The method of claim 3 wherein the intervals are further determined by comparing the image data in the red channel, green channel and the blue channel.

5. The method of claim 2 wherein the intervals are based on the frame rate of the visible light input signal.

6. The method of claim 2 wherein the intervals are based on the frame rate of the infrared input signal.

7. An image processing system for interweaving visible image data with infrared image data comprising:

a color substitution processor configured to:

receive a visible input signal and an infrared input signal, the visible input signal including three color channels; and process the visible input signal and the infrared input signal into a combined output signal by interweaving channels of the visible input signal and the infrared input signal; and an image processor coupled to the color substitution processor and configured to:

receive the combined output signal;

process the combined output signal into a plurality of sequential frames; and control a light source sequencer to operate a plurality of visible and infrared light sources in synchronization with an imager device, wherein data from the infrared input signal is sequentially substituted in for the color channels, such that:

in a first frame of three sequential frames, a first color channel is substituted with the infrared input signal, in a second frame of three sequential frames, either a second color channel or a third color channel is substituted with the infrared input signal, and in a third frame of three sequential frames, the remaining color channel not substituted in the second frame is substituted with the infrared input signal.

8. The image processing system of claim 7 wherein the image processor is further configured to send the plurality of sequential frames to the imager device.

9. The image processing system of claim 8 further configured to substitute the frames from the infrared input in for one or more of the color channels at intervals.

10. The image processing system of claim 9 further configured to determine the intervals based on a comparison of the content of the color channels in the visible input signal.

11. The image processing system of claim 9 further configured to determine the intervals based on the comparison of the content of the infrared input signal and the content of the color channels in the visible input signal.

12. The image processing system of claim 8 further configured to receive the visible input signal and the infrared input signal in parallel or in series.

* * * * *